(12) United States Patent
Kim et al.

(10) Patent No.: US 8,793,648 B2
(45) Date of Patent: Jul. 29, 2014

(54) METHOD AND DEVICE FOR LOADING SERVICE APPLICATION OF ROBOT BASED ON UBIQUITOUS ROBOTIC COMPANION (URC) ENVIRONMENT

(75) Inventors: Kun-Ouk Kim, Daejeon (KR); Young-Ho Suh, Gwangju (KR); Hyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 347 days.

(21) Appl. No.: 12/971,117

(22) Filed: Dec. 17, 2010

(65) Prior Publication Data

US 2011/0153075 A1 Jun. 23, 2011

(30) Foreign Application Priority Data

Dec. 18, 2009 (KR) .......................... 10-2009-0127076
May 11, 2010 (KR) .......................... 10-2010-0043869

(51) Int. Cl.
*G06F 9/44* (2006.01)
(52) U.S. Cl.
USPC ............................ 717/106; 717/109; 717/114
(58) Field of Classification Search
None
See application file for complete search history.

(56) References Cited

U.S. PATENT DOCUMENTS

| | | | |
|---|---|---|---|
| 7,017,148 B2 * | 3/2006 | Kumar ........................... | 717/114 |
| 7,114,146 B2 * | 9/2006 | Zhang et al. .................. | 717/106 |
| 7,539,747 B2 * | 5/2009 | Lucovsky et al. ............. | 709/224 |
| 7,657,557 B2 * | 2/2010 | Super et al. .................... | 717/109 |
| 7,827,527 B1 * | 11/2010 | Chiluvuri ....................... | 717/109 |
| 7,877,725 B2 * | 1/2011 | Vitanov et al. ................ | 717/106 |
| 8,341,595 B2 * | 12/2012 | Arner et al. .................... | 717/109 |
| 8,402,432 B2 * | 3/2013 | Shenfield et al. ............. | 717/114 |
| 2003/0093769 A1 * | 5/2003 | Kumar .......................... | 717/108 |
| 2004/0015844 A1 * | 1/2004 | Nicolle et al. ................. | 717/114 |
| 2004/0199614 A1 | 10/2004 | Shenfield et al. | |
| 2006/0200800 A1 * | 9/2006 | Melby ........................... | 717/114 |
| 2007/0006188 A1 * | 1/2007 | Schroth et al. ................ | 717/140 |
| 2007/0028208 A1 * | 2/2007 | Maki ............................. | 717/106 |
| 2008/0168431 A1 | 7/2008 | Ito et al. | |
| 2009/0013310 A1 * | 1/2009 | Arner et al. .................... | 717/120 |
| 2010/0269094 A1 * | 10/2010 | Levenshteyn et al. ........ | 717/109 |

FOREIGN PATENT DOCUMENTS

JP 9-167003 6/1997

(Continued)

OTHER PUBLICATIONS

IEEE 100 The Authoritative Dictionary of IEEE Standards Terms Seventh Edition, 2000, p. 988, Retrieved on [Oct. 16, 2013] Retrieved from the Internet: URL<http://ieeexplore.ieee.org/xpl/mostRecentIssue.jsp?reload=true&punumber=4116785>.*

(Continued)

*Primary Examiner* — Thuy Dao
*Assistant Examiner* — Cheneca Smith
(74) *Attorney, Agent, or Firm* — Staas & Halsey LLP

(57) ABSTRACT

Disclosed are a method and a device for loading a service application of a robot based on a ubiquitous robotic companion (URC) environment. The method for loading a service application of a robot includes: generating a service code for a service which is implemented by the robot from at least one descriptor; and generating at least one service object based on the generated service code and loading the at least one generated service object on the robot.

14 Claims, 5 Drawing Sheets

(56) References Cited

FOREIGN PATENT DOCUMENTS

| | | |
|---|---|---|
| JP | 2005-301494 | 10/2005 |
| JP | 2006-215826 | 8/2006 |
| JP | 2007-140912 | 6/2007 |
| JP | 2007-157166 | 6/2007 |
| JP | 2009-15557 | 1/2009 |
| KR | 10-2005-0091027 | 9/2005 |
| KR | 10-2006-0058948 | 6/2006 |
| KR | 10-2007-0061239 | 6/2007 |
| KR | 10-2008-0075412 | 8/2008 |
| KR | 10-2009-0093652 | 9/2009 |

OTHER PUBLICATIONS

Guimares et al.REAL-A Virtual Laboratory Built from Software Components, Proceedings of the IEEE, Mar. 2003, vol. 91, pp. 440-448 Retrieved on [Mar. 19, 2014] Retrieved from the Internet: URL<http://ieeexplore.ieee.org/stamp/stamp.jsp?tp=&arnumber=1192271>.*

Sunderland et al.An Approach to the Simulation of Robotic Systems Using XML Based Configuration Files,Proceedings of DETC'04, Sep. 28-Oct. 2, 2004, Retrieved on [Mar. 19, 2014] Retrieved from the Internet: URL<http://citeseerx.ist.psu.edu/viewdoc/download-?doi=10.1.1.97.1584&rep=rep1&type=pdf>.*

* cited by examiner

FIG.5

```xml
<?xml version="1.0" encoding="EUC-KR"?>
<bundle_descriptor id="hcilab" extension="hcilab-vc9d.dll">
    <component class="HCILabPcmPlayer">
        <type>camus.service.sound.PcmPlayer</type>
        <description>PCM PLAYER</description>
    </component>
    <component class ="HCILabTextToSpeech">
        <type>camus.service.speech.TextToSpeech</type>
        <description>SPEECH SYNTHESIS</description>
        <properties>
            <property>
                <name>host</name>
                <type>string</type>
                <description>HOST NAME</description>
            </property>
            <property>
                <name>port</name>
                <type>int</type>
                <description>PORT</description>
            </property>
            <property>
                <name>sampleRate</name>
                <type>int</type>
                <description>SAMPLE Rate</description>
            </property>
        </properties>
    </component>
</buldle_descriptior>
```

FIG.6

```
#ifndef _HCILABPCMPLAYERPROVIDERSC_H_
define _HCILABPCMPLAYERPROVIDERSC_H_ include "sound/HCILabPcmPlayer.h"
include "camus/service/sound/PcmPlayerServant.h"
#include "etri/camus/scm/bundle/ServiceComponent.h"

class HCILabPcmPlayer;

class HCILabPcmPlayerSC: public etri::camus::scm::bundle::ServiceComponent
{
public:
    HCILabPcmPlayerSC(planet::PlanetServer* pPlanet, HCILabPcmPlayer* pService)
        : ServiceComponent(new camus::service::sound::
            PcmPlayerServant(pPlanet, pService)),m_pService(pService){}
    virtual ~HCILabPcmPlayerSC()
    {
        delete m_pService;
    }
    void setProperty(std::string &name, std::string &value)
    {
        if ( name == "id") {
            m_pService->setId(value);
        }
        else if (name == "delay") {
        }
    } virtual bool isPublisher()
    {
        return false;
    }
    virtual ::camus::spi::scm::SensorComponent* getPublisher()
    {
        return NULL;
    }
private:
    HCILabPcmPlayer* m_pService;
};

#endif // HCILABPCMPLAYERPROVIDERSC_H
```

METHOD AND DEVICE FOR LOADING SERVICE APPLICATION OF ROBOT BASED ON UBIQUITOUS ROBOTIC COMPANION (URC) ENVIRONMENT

CROSS REFERENCE TO RELATED APPLICATIONS

This application claims priority to Korean Patent Application No. 10-2009-0127076 filed on Dec. 18, 2009 and Korean Patent Application No. 10-2010-0043869 filed on May 11, 2010, the entire contents of which are herein incorporated by reference.

BACKGROUND OF THE INVENTION

1. Field of the Invention

The present invention relates to a ubiquitous robotic companion (URC) technology, and more particularly, to a method and a device for loading service application of a robot based on a ubiquitous robotic companion capable of dynamically loading a service on a plurality of ubiquitous robots under a ubiquitous robotic companion environment.

2. Description of the Related Art

In recent years, with the technological development of a service robot, a user can receive a predetermined service from a robot. Further, the user can receive the service from environment devices such as an electronic appliance, a security device, etc., which are used in a home in addition to the robot by the introduction of the concept a ubiquitous robotic companion (URC).

In the related art, a service which can be performed by the robot or the environment device is prepared by using a programming language and the prepared service is stored in the robot or the environment device so as to implement the service robot.

However, since the service is very variable, variability in which a new service is generated or an already stored service is removed causes a problem in a developer's implementing the service through programming.

In particular, in the related art, the developer is programming the service by using C++, etc., and service information is prepared in a programming code, which needs to go through compiling and linking processes in order to load a new service because of the characteristics of C++.

This inconveniences the developer and causes much time to be taken to develop the service. Further, when the robot or the environment device does not have a compiling function, a problem occurs in a further operation of removing the programmed service.

SUMMARY OF THE INVENTION

The present invention has been made in an effort to provide a method for loading a robot service capable of increasing the convenience of a service developer and dynamically loading a service.

The present invention has been made in another effort to provide an apparatus for loading a service for loading a robot service.

An exemplary embodiment of the present invention provides a method for loading a service application of a robot that includes: generating a service code for a service which is implemented by the robot from at least one descriptor; and generating at least one service object based on the generated service code and loading the at least one generated service object on the robot.

Another embodiment of the present invention provides a device for loading a service application of a robot that includes: a service manager generating a service code for a service which is implemented by the robot from at least one inputted descriptor, and generating and outputting at least one service object base on the generated service code; and a service agent loading the at least one service object, and extracting and outputting the corresponding service object among the at least one loaded service object in accordance with a service request command inputted from a user.

According to a method and an apparatus for loading a robot service of an exemplary embodiment of the present invention, a developer describes an XML-based descriptor and stores it in a robot or an environment device, and thereafter, generates a service which can be implemented by the robot or the environment device by using the same so as to provide the convenience of service development to the developer.

BRIEF DESCRIPTION OF THE DRAWINGS

The above and other aspects, features and other advantages of the present invention will be more clearly understood from the following detailed description taken in conjunction with the accompanying drawings, in which:

FIG. 5 is a diagram showing an exemplary embodiment of a descriptor inputted by a developer; and FIG. 6 is a diagram showing an exemplary embodiment of a service code generated from a descriptor.

DETAILED DESCRIPTION OF THE PREFERRED EMBODIMENTS

Figure 1:
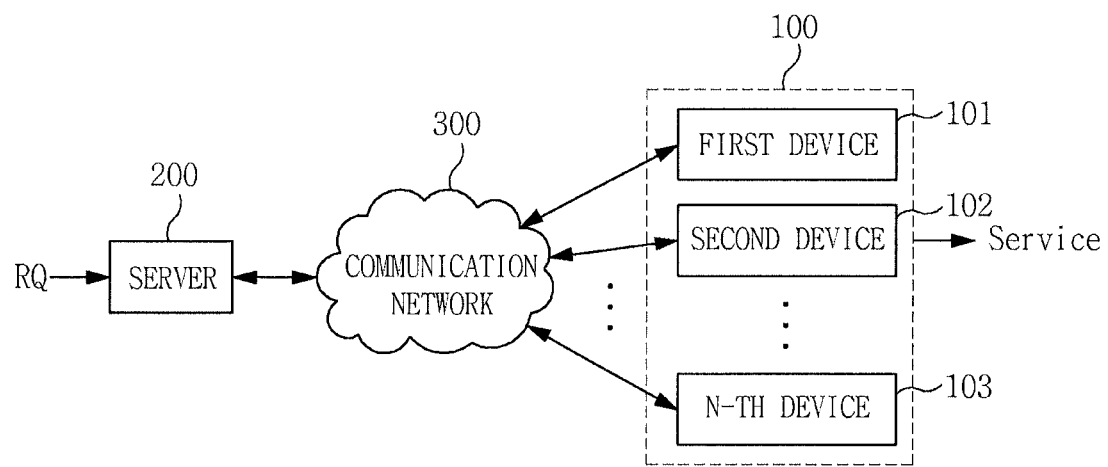
FIG. 1 is a configuration diagram of a URC system capable of implementing a ubiquitous robotic companion (URC) environment according to an exemplary embodiment of the present invention.

The accompanying drawings illustrating embodiments of the present invention and contents described in the accompanying drawings should be referenced in order to fully appreciate operational advantages of the present invention and objects achieved by the embodiments of the present invention.

For convenience of description, a ubiquitous robotic companion (URC) system capable of implementing a user's desired service by using various ubiquitous service robots or environment devices that are disposed in a home or office will be described as an example.

Hereinafter, the present invention will be described in detail by describing preferred embodiments of the present invention with reference to the accompanying drawings. Like elements refer to like reference numerals shown in the drawings.

FIG. 1 is a configuration diagram of a URC system capable of implementing a ubiquitous robotic companion (URC) environment according to an exemplary embodiment of the present invention.

Referring to FIG. 1, the URC system 10 may include a plurality of URC devices 101, 102, and 103, a communication network 300, and a URC server 200.

Each of the plurality of URC devices 101, 102, and 103 may be a robot device capable of implementing a ubiquitous service or an environment device such as an electronic appliance or a security device.

The plurality of URC devices 101, 102, and 103 may be connected to the URC server 200 through the communication network 300 or may be connected to each other through the communication network 300.

Operations of the URC devices 101, 102, and 103 are controlled in accordance with a service request command RQ inputted from a user (alternately, a service user) so as to provide a service to the user.

For example, the user may input the service request command RQ in the URC server 200 and the URC server 200 may transmit the service request command RQ inputted from the user to at least one corresponding URC device 101, 102, or 103 among the plurality of URC devices 101, 102, and 103 through the communication network 300.

In addition, the URC devices 101, 102, and 103 receiving the service request command RQ from the URC server 200 may provide the service to the user by at least one service object corresponding to the service request command RQ among at least one stored service object.

Herein, the service objects in the URC devices 101, 102, and 103 may be programmed and stored by a developer (alternately, a manager).

In this case, when two or more URC devices 101, 102, and 103 are used to provide the service in accordance with the service request command RQ inputted from the user, two or more URC devices 101, 102, and 103 may be interoperated with each other through the communication network 300.

In addition, two or more URC devices 101, 102, and 103 implement the service by using the service object corresponding to the received service request command RQ and in this case, may control the implemented services to be implemented in synchronization with each other.

Herein, the communication network 300 may a wire/wireless communication network and in the exemplary embodiment of the present invention, a short-range wireless communication network used in interior space such as the home or office will be described as an example.

The URC server 200 receives information on services which can be implemented by the plurality of URC devices 101, 102, and 103 and may provide them to the user.

Further, the URC server 200 analyzes the service request command RQ inputted from the user and may extract the optimal URC device 101, 102, or 103 which can perform the service request command RQ inputted among the plurality of URC devices 101, 102, and 103 connected through the communication network 300 in accordance with an analysis result.

In addition, the URC server 200 may transmit the servicer request command RQ of the user to the extracted URC device 101, 102, or 103.

Further, the URC server 200 may periodically update information on the services of the plurality of URC devices 101, 102, and 103, which may be changed by the developer afterwards.

Figure 2:
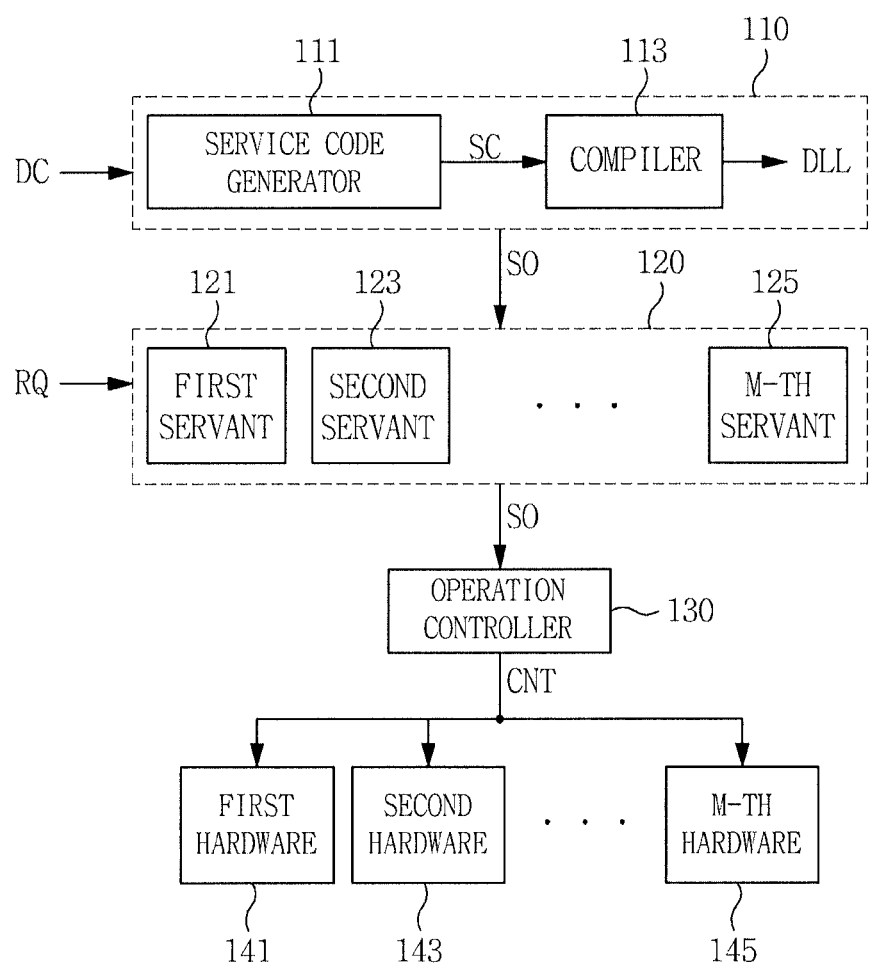
FIG. 2 is a configuration diagram of one URC device among a plurality of URC devices shown in FIG. 1.

FIG. 2 is a configuration diagram of one URC device among a plurality of URC devices shown in FIG. 1. Hereinafter, a configuration of one URC device (hereinafter, referred to as a 'first URC device') 101 among the plurality of URC devices 101, 102, and 103 will be described as an example, but configurations of the rest of the URC devices 102 and 103 may also be the same as the configuration of the first URC device 101.

Referring to FIGS. 1 and 2, the first URC device 101 may generate at least one service object SO from a descriptor DC for the service from the developer and may store it.

For this, the first URC device 101 may include a service manager 110, a service agent 120, an operation controller 130, and a plurality of hardware 141, 143, and 145.

The service manager 110 may generate a service code SC and a dynamic link library DLL from the descriptor DC inputted from the developer and may generate the service object SO by using them.

The service manager 110 may generate the service object SO by receiving the service code SC and the dynamic link library DLL from the developer according to various embodiments of the present invention.

The service manager 110 may include a service code generator 111 and a complier 113.

The service code generator 111 may receive the descriptor DC, i.e., a service descriptor DC prepared based on an extensible markup language (XML) as shown in FIG. 5 from the developer.

Herein, referring to FIG. 5, the information on the service which can be performed by the first URC device 101 may be described in the descriptor DC and may include a service type (alternately, an interface), and a class name and a property (an attribute value) implemented from the same.

Further, a plurality of service information may be described in one descriptor DC and the descriptors DC may be described for the plurality of services, respectively.

The service code generator 111 may generate and output the service code SC, i.e., a service code SC prepared based on C++as shown in FIG. 6 on the basis of the inputted descriptor DC. The complier 113 may generate the dynamic link library DLL by compiling the service code SC outputted from the service code generator 111.

Herein, the complier 113 may receive an attribute value for the service code SC, i.e., a service code property from the developer and may perform a compiling operation after adding the service code property to the service code SC.

The service manager 110 may generate at least one service object SO on the basis of the service code SC generated from the service code generator 111 and the dynamic link library DLL generated from the compiler 113.

The generated service object SO may be outputted to the service agent 120.

The service agent 120 may store the service object SO outputted from the service manager 110.

The service agent 120 may extract and output the corresponding service object SO among the service objects SO stored based on the service request command RQ inputted from the user.

The service agent 120 may include a plurality of servants, i.e., a first servant 121 to an M-th servant 125.

Herein, the first servant 121 to the M-th servant 125 of the service agent 120 may be generated based on the dynamic link library DLL generated from the service manager 110.

Further, the first servant 121 to the M-ht servant 125 may bind the service objects SO outputted from the service manager 110 and store them.

Therefore, the service agent 120 may extract one of the service objects SO bound to the first servant 121 to the M-th servant 125, respectively on the basis of the service request command RQ inputted from the user.

The service agent 120 may output the extracted service object SO to the operation controller 130.

The operation controller 130 may control operations of the plurality of hardware constituting the first URC device 101, i.e., a first hardware 141 to an m-th hardware 145 on the basis of the service object SO outputted from the service agent 120 and may implement a user's desired service therefrom.

For example, the operation controller 130 may generate a control signal CNT for controlling the operation of the first URC device 101 from the service object SO.

The operation controller 130 may control the operation of the first URC device 101 by outputting the generated control signal CNT to the corresponding hardware among the first hardware 141 to the m-th hardware 145.

For example, the user may input the service request command RQ in order to receive a service for moving an object in the home or office.

The service agent 120 of the first URC device 101 receiving the service request command RQ from the URC server 200 may extract and output the service object SO corresponding to the service request command RQ among the service objects SO stored in the first servant 121 to the M-th servant 125, respectively.

The operation controller 130 may generate and output the control signal CNT on the basis of the service object SO outputted from the service agent 120.

In this case, the control signal CNT may control an operation of hardware which can move the object, i.e., hardware which can acquire an object by moving the first URC device 101 to a location where the object is positioned and moves the acquired object to a predetermined location among the plurality of hardware of the first URC device 101.

Accordingly, the first URC device 101 may provide the user's desired service through the hardware of which the operation is controlled by the control signal CNT.

Figure 3:
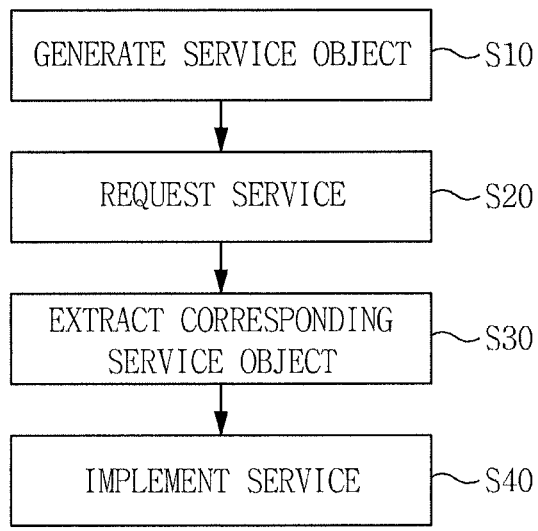
FIG. 3 is a flowchart for a service implementing operation using a URC system according to an exemplary embodiment of the present invention.

FIG. 3 is a flowchart for a service implementing operation using a URC system according to an exemplary embodiment of the present invention. In the exemplary embodiment, for convenience of description, an example in which the first URC device 101 shown in FIG. 2 implements the service in response to the service request command RQ inputted from the user will be described as an example. However, the rest URC devices 102 and 103 other than the first URC device 101 may also implement the service by using substantially the same method.

Referring to FIGS. 1 to 3, the developer describes the information on the service which can be performed by the first URC device 101, i.e., the descriptor DC and may input the descriptor DC in the first URC device 101.

For example, the developer may input the service descriptor DC prepared based on the XML described with reference to FIG. 5 in the first URC device 101.

The first URC device 101 may generate at least one service object SO on the basis of the inputted descriptor DC (S 10).

For example, the service manager 110 of the first URC device 101 may generate the service code SC and the dynamic link library DLL on the basis of the inputted descriptor DC. The first URC device 101 may generate the service object SO by using them. The generated service object SO may be stored in the servants 121, 123, and 125 of the service agent 120.

The generation operation of the service object SO will be described in detail with reference to FIG. 4 afterwards.

Meanwhile, the user who wants to receive the service through the first URC device 101 ma input the service request command RQ requesting the desired service among the services of the first URC device 101 provided from the URC server 200 (S20).

The URC server 200 may transmit the service request command RQ inputted from the user to the first URC device 101 and the first URC device 101 may extract the corresponding service object SO among the stored service objects SO in accordance wit the service request command RQ (S30).

For example, the service agent 120 of the first URC device 101 may extract the service object SO corresponding to the service request command RQ among the service objects SO bound to the plurality of servants 121, 123, and 125, respectively on the basis of the service request command RQ.

Next, the extracted service object SO is provided to the operation controller 130 and the operation controller 130 may generate the control signal CNT corresponding to the service object SO and output the control signal to each of the plurality of hardware 141, 143, and 145.

Each of the plurality of hardware 141, 143, and 145 constituting the first URC device 101 may perform the user's desired service in accordance with the control signal CNT outputted from the operation controller 130 (S40).

Figure 4:
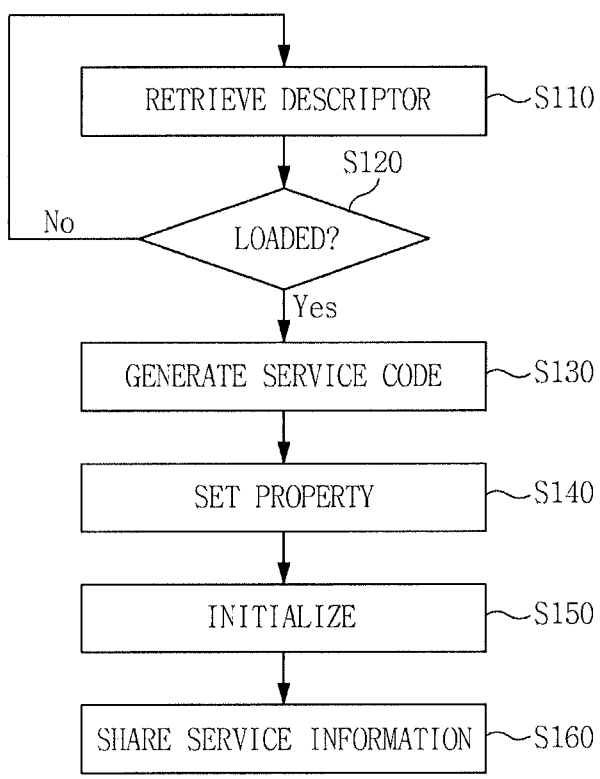
FIG. 4 is a flowchart for an operation of generating a service object in a URC device.

FIG. 4 is a flowchart for an operation of generating a service object in a URC device. Even in the embodiment, an example in which the first URC device 101 shown in FIG. 2 generates the service object SO will be described.

Referring to FIGS. 1, 2, and 4, a developer may input at least one descriptor DC describing a service which the developer wants to develop on the basis of an XML in the first URC device 101.

The first URC device 101 may store at least one inputted descriptor DC in predetermined storing space.

Herein, the developer may describe the service which can be performed by the first URC device 101 as the descriptor DC and may describe services which can be performed by a plurality of URC devices 101, 102, and 103 including the first URC device 101 as a bundle descriptor.

When the developer describes the services which can be performed by the plurality of URC devices 101, 102, and 103 as the bundle descriptor, the first URC device 101 may generate a service code SC by extracting only the descriptor DC for the service which can be performed by the first URC device 101 while storing the bundle descriptor (S110). Herein, the information on the plurality of services may be included in the bundle descriptor.

For example, the first URC device 101 retrieves the stored bundle descriptor and may determine and extract a descriptor DC which may be loaded (alternately, mounted) on the first URC device 101 among the bundle descriptors (S210).

In addition, a service manager 110 of the first URC device 101 may generate the service code SC from the extracted descriptor DC (S130).

Next, the developer may input a property (an attribute value) of the service code SC generated by referring to the extracted descriptor DC (S140) and the service manager 110 may generate a dynamic link library DLL by compiling the service code SC inputted with the property.

Meanwhile, the service manager 110 may initialize the service code SC inputted with the property (S150) and may generate the service object SO from the initialized service code SC.

In addition, the generated service object SO may be bound to a servant generated by the service agent 120.

Herein, the service agent 120 may generate the servants 121, 123, and 125 on the basis of the dynamic link library DLL generated by the service manager 110 and may generate the servants to correspond to the number of generated dynamic link libraries DLL (alternately, the number of generated service codes SC).

The service agent 120 binds and store the service object SO and may transmit information on the bound service object SO, i.e., information on the service which can be performed by the first URC device 101 to the URC server 200.

The URC server 200 may provide the transmitted service information of the first URC device 101 to the user and may receive the service request command RQ depending on user's selection (S 160).

That is, the user selects a service which the user wants to receive from the information on the services which can be performed by the first URC device 101, which is provided by the URC server 200 and thereafter, may input a service request command RQ for requesting the selected service in the URC server 200.

The URC server 200 may transmit the service request command RQ inputted from the user to the first URC device 101 and the first URC device 101 may implement the user's desired service by using the stored service object SO in accordance wit the service request command RQ.

Meanwhile, in the case of removing the existing service used, the existing service can be easily removed by just removing the descriptor DC stored in the first URC device 101.

While the present invention has been shown and described in connection with the exemplary embodiments, it will be apparent to those skilled in the art that modifications and variations can be made without departing from the spirit and scope of the invention as defined by the appended claims.

What is claimed is:

1. A processor-executed method for loading a service application of a robot, comprising:
    transmitting a service request to at least one robot;
    generating a service code for a service implemented by the robot from at least one descriptor comprising a service type, a class name and a property; and
    generating at least one service object based on the generated service code and loading the at least one service object on the robot,
    wherein the loading the at least one service object on the robot includes:
    generating a dynamic link library by adding an inputted property to the service code and compiling the service code added with the property, and
    generating at least one servant based on the dynamic link library, and binding the at least one service object generated based on the service code to the at least one servant, respectively, and
    wherein two or more robots interoperate to provide the requested service, and the two or more robots implement the requested service in synchronization with each other.

2. The method of claim 1, wherein the generating of the service code includes:
    receiving a bundle descriptor including descriptors for a plurality of services;
    extracting a descriptor for the service implemented by the robot from the bundle descriptor; and
    generating the service code from the extracted descriptor.

3. The method of claim 1, wherein the loading of the at least one service object on the robot further includes initializing the service code added with the property.

4. The method of claim 1, wherein the at least one servant is generated based on the number of the generated dynamic link libraries.

5. The method of claim 1, wherein the at least one servant is generated based on the number of the generated service codes.

6. The method of claim 1, further comprising, after loading the at least one service object on the robot, implementing the service for a user by using the at least one loaded service object based on a service request command inputted from the user.

7. The method of claim 6, wherein the implementing of the service includes:
    extracting the corresponding service object among the at least one loaded service object in accordance with the service request command; and
    implementing the service by generating a control signal based on the extracted service object and controlling an operation of the robot in accordance with the control signal.

8. The method of claim 1, wherein the at least one descriptor is described with an XML-based code.

9. The method of claim 1, wherein the service code is generated with a C++-based code.

10. A device for loading a service application of a robot, comprising:
    a transmitter that transmits a service request to at least one robot;
    a service manager, of a processor of the device, generating a service code for a service which is implemented by the robot from at least one inputted descriptor, and generating and outputting at least one service object based on the generated service code from at least one descriptor comprising a service type, a class name and a property; and
    a service agent loading the at least one service object, and extracting and outputting the corresponding service object among the at least one loaded service object in accordance with a service request command inputted from a user,
    wherein the service manager includes:
    a service code generator generating the service code from the at least one descriptor, and
    a complier generating a dynamic link library by compiling the service code,
    wherein the service manager generates the at least one service object based on the service code and the dynamic link library, and
    wherein the service agent generates at least one servant based on the number of the generated dynamic link libraries, and binds and loads the at least one service object outputted from the service manager to the at least one servant, respectively, and
    wherein two or more robots interoperate to provide the requested service, and the two or more robots implement the requested service in synchronization with each other.

11. The device of claim 10, wherein the compiler generates the dynamic link library by adding a property inputted from the outside to the service code and compiling the service code added with the property.

12. The device of claim 10, wherein the service agent generates at least one servant based on the number of the generated service codes, and binds and loads the at least one service object outputted from the service manager to the at least one servant, respectively.

13. The device of claim 10, wherein the service manager generates the service code described with a C++-based code from the descriptor described with an XML-based code.

14. The device of claim 10, further comprising an operation controller generating a control signal based on the service object outputted from the service agent,
    wherein the operation controller implements a service corresponding to the service request command for a user by controlling operations of a plurality of hardware of the robot based on the control signal.

* * * * *